United States Patent
Park et al.

(10) Patent No.: US 8,367,206 B2
(45) Date of Patent: Feb. 5, 2013

(54) FINE BARIUM TITANATE POWDER

(75) Inventors: Sei Ung Park, Daejeon (KR); Ju Suk Ryu, Daejeon (KR); Seong Jae Lim, Daejeon (KR); In Jae Baek, Daejeon (KR)

(73) Assignee: Hanwha Chemical Corporation, Seoul (KR)

( * ) Notice: Subject to any disclaimer, the term of this patent is extended or adjusted under 35 U.S.C. 154(b) by 0 days.

(21) Appl. No.: 13/255,554

(22) PCT Filed: Mar. 12, 2010

(86) PCT No.: PCT/KR2010/001564
§ 371 (c)(1),
(2), (4) Date: Sep. 9, 2011

(87) PCT Pub. No.: WO2010/104358
PCT Pub. Date: Sep. 16, 2010

(65) Prior Publication Data
US 2011/0318583 A1  Dec. 29, 2011

(30) Foreign Application Priority Data

Mar. 12, 2009 (KR) .......... 10-2009-0021198
Jul. 21, 2009 (KR) .......... 10-2009-0066243

(51) Int. Cl.
*B32B 5/16* (2006.01)

(52) U.S. Cl. ......... 428/402; 428/404; 423/598; 423/608

(58) Field of Classification Search .......... 428/402, 428/404; 423/598, 608
See application file for complete search history.

(56) References Cited

U.S. PATENT DOCUMENTS 7,854,916 B2 * 12/2010 Park et al. .......... 423/598

FOREIGN PATENT DOCUMENTS

| JP | 2005-075650 | * | 3/2005 |
| JP | 2005075650 A | | 3/2005 |
| JP | 2008-156202 | * | 7/2008 |
| JP | 2008156202 A | | 7/2008 |
| KR | 20020048101 A | | 6/2002 |
| KR | 10-0360118 | * | 11/2002 |
| KR | 100360118 B1 | | 11/2002 |

* cited by examiner

*Primary Examiner* — Leszek Kiliman
(74) *Attorney, Agent, or Firm* — The Webb Law Firm

(57) ABSTRACT

Provided is barium titanate based powder represented by Chemical Formula 1:

$$(Ba_x R^1_{r1} R^2_{r2})(Ti_y R^3_{r3} R^4_{r4})O_3 \quad \text{[Chemical Formula 1]}$$

wherein $R^1$ is at least one element selected from the group consisting of yttrium (Y) and lanthanoids; $R^2$ is at least one element selected from the group consisting of magnesium (Mg), calcium (Ca) and strontium (Sr); $R^3$ includes phosphorus (P) and niobium (Nb); $R^4$ is at least one element selected from the group consisting of aluminum (Al), vanadium (V), chrome (Cr), manganese (Mn), cobalt (Co), zirconium (Zr) and tantalum (Ta); $r_1$ and $r_3$ independently represent a real number greater than 0 and equal to or less than 0.05; $r_2$ and $r_4$ independently represent a real number greater than 0 and equal to or less than 0.1; and $(x+r_1+r_2)/(y+r_3+r_4)$ is a real number ranging from 0.85 to 1.15.

11 Claims, 1 Drawing Sheet

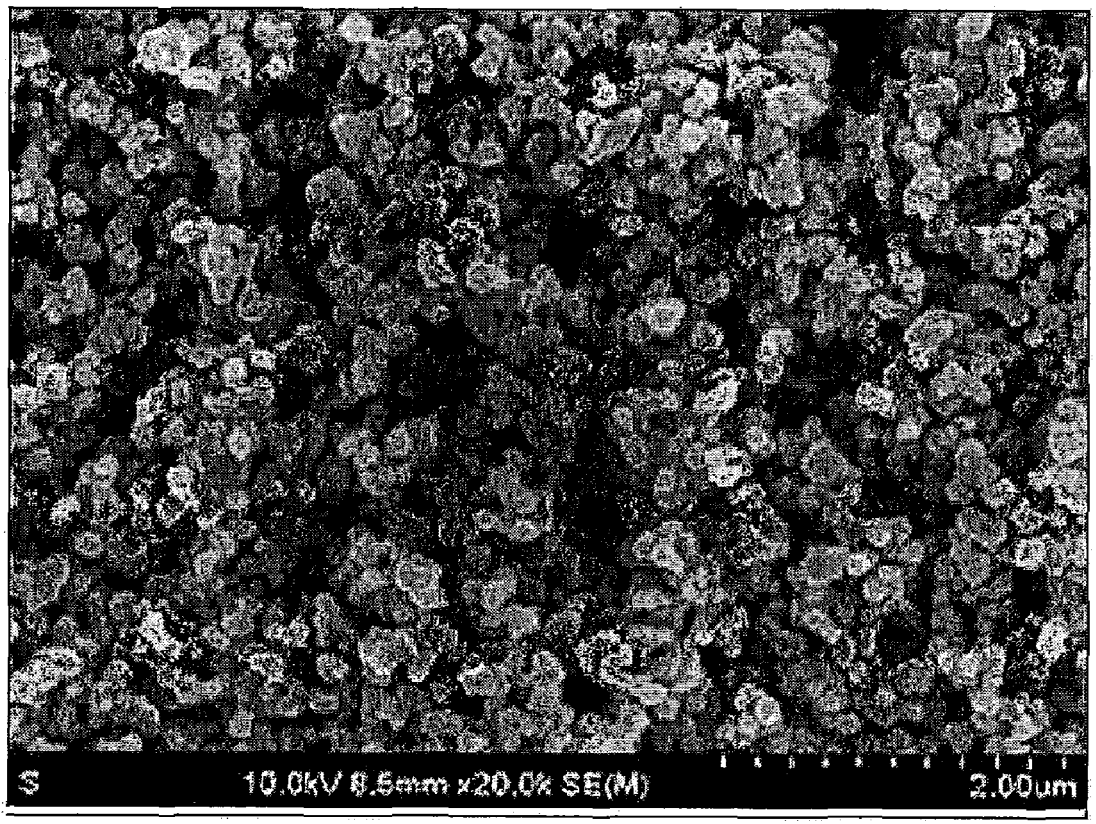

FINE BARIUM TITANATE POWDER

BACKGROUND OF THE INVENTION

1. Field of the Invention

The present invention relates to fine barium titanate based powder having a high dielectric constant and a low temperature coefficient of capacitance. The barium titanate based powder in accordance with the present invention has high sintering density, low dielectric loss and high insulation resistance. The present invention also relates to a dielectric material including the fine barium titanate based powder and a ceramic electronic part including the dielectric material.

2. Description of Related Art

Since barium titanate (BaTiO$_3$) has a high dielectric constant and excellent polarization hysteresis and piezoelectric effect, and may impart semiconductive property with ease upon the addition of a dopant, it has been widely used as a material for ceramic electronic parts, such as ceramic capacitors, amplifiers, memory devices, modulators, electroacoustic transducers, actuators, other piezoelectrics, positive thermistors, semiconductors, etc. Particularly, tetragonal barium titanate is a ferroelectric, and thus has a very high dielectric constant and polarization hysteresis. Therefore, tetragonal barium titanate is widely used as a dielectric material in multi-layer ceramic capacitors (MLCCs).

Recently, as electronic instruments have been miniaturized rapidly, it has been required for ceramic electronic parts to have a compact size and high capacity. Particularly, in the case of a MLCC, it has been required for a dielectric layer to have a small thickness and to be stacked in a higher number. Because the number of barium titanate particles that can be contained in one dielectric layer is limited, barium titanate should be provided as finer particles as the dielectric layer has a smaller thickness. Therefore, many attempts have been made to maintain a high dielectric constant despite the provision as fine particles, to minimize a temperature coefficient of capacitance, and to improve a sintering density, dielectric loss and insulation resistance, so that barium titanate may be applied to a high-capacity MLCC.

For example, Korean Laid-Open Patent No. 2002-0048101 discloses a method for preparing barium titanate powder for X7R MLCCs, including: mixing and drying starting materials formed of barium carbonate (BaCO$_3$) and titanium dioxide (TiO$_2$) and calcinating the resultant mixture; pulverizing the resultant powder crudely, adding thereto additives containing an acceptor, a doner, a particle growth inhibitor and a sintering aid in an amount of 1.6-4.0 g per 100 g of the powder, and finely pulverizing the resultant mixture; drying the mixed powder containing the additives and further calcinating the powder; and further pulverizing the resultant powder crudely, followed by additional fine pulverization. However, the resultant particles are too crude to be applied to a high-capacity MLCC and have a large temperature coefficient of capacitance.

Japanese Laid-Open Patent No. 2008-156202 discloses a dielectric ceramic including grains based on barium titanate and grain boundaries formed among the grains, the dielectric ceramic being characterized in that it includes, per mole of barium forming the barium titanate, 0.01-0.06 moles of magnesium as expressed by MgO, 0.0015-0.03 moles of yttrium as expressed by Y$_2$O$_3$ and 0.0002-0.03 moles of manganese as expressed by MnO, further includes 4.2-33.3 parts by weight of niobium as expressed by Nb$_2$O$_5$ per 100 parts by weight of barium titanate, and has an average particle diameter of the grains of 0.05-0.2 μm. However, the dielectric ceramic has a very low dielectric constant so that it may not be applied to a high-capacity MLCC.

In general, barium titanate having a smaller particle diameter has a lower ferroelectric tetragonal phase content and a higher paraelectric cubic phase content, resulting in a drop in dielectric constant and a decrease in capacitance. In conclusion, according to the related art, it is not possible to provide barium titanate based powder in the form of fine particles having a high dielectric constant and a low temperature coefficient of capacitance, and satisfying some electrical properties, such as sintering density, dielectric loss and insulation resistance, applicable to a ceramic capacitor.

DISCLOSURE

Technical Problem

An embodiment of the present invention is directed to providing fine barium titanate based powder for use in a ceramic electronic part based on a dielectric material, particularly in a high-capacity MLCC.

Technical Solution

To achieve the object of the present invention, the present invention provides fine barium titanate based powder having a high dielectric constant and a low temperature coefficient of capacitance. The barium titanate based powder also has high sintering density, low dielectric loss and high insulation resistance.

In one aspect, there is provided barium titanate based powder represented by Chemical Formula 1:

$$(Ba_x R^1_{r1} R^2_{r2})(Ti_y R^3_{r3} R^4_{r4})O_3 \quad \text{[Chemical Formula 1]}$$

wherein R$^1$ is at least one element selected from the group consisting of yttrium (Y) and lanthanoids; R$^2$ is at least one element selected from the group consisting of magnesium (Mg), calcium (Ca) and strontium (Sr); R$^3$ includes phosphorus (P) and niobium (Nb); R$^4$ is at least one element selected from the group consisting of aluminum (Al), vanadium (V), chrome (Cr), manganese (Mn), cobalt (Co), zirconium (Zr) and tantalum (Ta); r$_1$ and r$_3$ independently represent a real number greater than 0 and equal to or less than 0.05; r$_2$ and r$_4$ independently represent a real number greater than 0 and equal to or less than 0.1; and $(x+r_1+r_2)/(y+r_3+r_4)$ is a real number ranging from 0.85 to 1.15.

Preferably, r$_1$, r$_2$, r$_3$ and r$_4$ independently represent a real number greater than 0 and equal to or less than 0.03.

In Chemical Formula 1, R$^1$ is an element that substitutes for and is alloyed with the site of a barium (Ba) element to generate a cation vacancy. The resultant cation vacancy compensates for an oxygen ion vacancy generated upon the firing under reductive atmosphere, thereby preventing degradation of insulation resistance. Most rare earth elements may be included therein, however, a part of rare earth elements have a different diffusion rate so that they may not provide the above mentioned effect but may cause abnormal particle growth. Therefore, R$^1$ is preferably at least one element selected from the group consisting of yttrium and lanthanoids, and more preferably R$^1$ is yttrium.

In Chemical Formula 1, R$^2$ is a Group 2 element, levels a variation in dielectric constant depending on temperatures and improves reliability. In addition, R$^2$ substitutes for the Ba element present on the surface layer and is alloyed therewith to control the particle growth and sintering density. Preferably, $R^2$ is at least one element selected from the group consisting of magnesium, calcium and strontium, more preferably, $R^2$ is magnesium.

$R^1$ and $R^2$ substitute for Ba elements or are present on the surface in the form of amorphous oxides. When $R^1$ and $R^2$ are present in an excessively large amount, they may cause the generation of a secondary phase, may be precipitated as crystalline oxides, or may be provided with semiconductive property, resulting in degradation of electrical properties and reliability. Thus, preferably, $r_1$ is greater than 0 and equal to or less than 0.05, $r_2$ is greater than 0 and equal to or less than 0.1. More preferably, $r_1$ and $r_2$ each are greater than 0 and equal to or less than 0.03.

In Chemical Formula 1, $R^3$ has a relatively small ion radius and a relatively large diffusion coefficient, and thus is alloyed more predominantly as compared to the element alloyed with the surface layer, thereby serving as a diffusion barrier that functions to inhibit any elements that should be present on the surface layer from being diffused into the particles. Therefore, $R^3$ functions to improve the electrical properties of a dielectric, to improve the lifespan and sintering characteristics, and to reduce a change in dielectric constant with time. Although niobium has been frequently used in such purposes to date, it is not preferred because the higher niobium content may cause a rapid drop in dielectric constant and impart semiconductive property, resulting in degradation in electrical properties and reliability. Instead, even a small amount of niobium may provide a desired effect sufficiently by substituting a certain amount of niobium with phosphorus. Therefore, $R^3$ preferably includes both niobium and phosphorus.

As mentioned above, barium titanate based powder in accordance with an embodiment of the present invention is characterized by including both niobium and phosphorus. More particularly, the barium titanate based powder is characterized in that the molar ratio of niobium to phosphorus is 1:0.1-2.0. When the amount of phosphorus added instead of niobium is too low or high, the barium titanate based powder may not provide a desired effect or may show degradation of electrical properties. Thus, the molar ratio of phosphorus to niobium preferably ranges from 0.1 to 2.0.

In Chemical Formula 1, $R^4$ is an element that functions to control a temperature coefficient of capacitance and to improve the electrical properties of a dielectric, such as dielectric loss and insulation resistance. Preferably, $R^4$ is an at least one element selected from the group consisting of aluminum, vanadium, chrome, manganese, cobalt, zirconium and tantalum. More preferably, $R^4$ includes aluminum, vanadium, chrome and manganese.

According to a preferred embodiment of the present invention, there is provided barium titanate based powder, wherein R1 is yttrium (Y), R2 is magnesium (Mg), R3 includes phosphorus (P) and niobium (Nb), and $R^4$ includes aluminum (Al), vanadium (V), chrome (Cr) and manganese (Mn).

$R^3$ and $R^4$ substitute for Ti elements, exist in the interstitial sites, or are present on the surface in the form of amorphous oxides. When $R^3$ and $R^4$ are present in an excessively large amount, they may cause the generation of a secondary phase, may be precipitated as crystalline oxides, or may be provided with semiconductive property, resulting in degradation of electrical properties and reliability. Thus, $r_3$ is preferably greater than 0 and equal to or less than 0.05, $r_4$ is greater than 0 and equal to or less than 0.1. More preferably, $r_3$ and $r_4$ each are greater than 0 and equal to or less than 0.03.

It is also important to control the value of $(x+r_1+r_2)/(y+r_3+r_4)$ to 0.85-1.15. More particularly, the real numbers, which allow the barium, titanium and the elements of $R^1$, $R^2$, $R^3$ and $R^4$ to be present so that the value of $(x+r_1+r_2)/(y+r_3+r_4)$ ranges from 0.85 to 1.15, are in such a range that the elements of $R^1$, $R^2$, $R^3$ and $R^4$ are alloyed completely into the barium titanate lattices or are present on the surface in the form of amorphous oxides while not forming a secondary phase. Therefore, when the value is away from above range, a severe variation in dielectric constant may occur at low temperatures and high temperatures, sintering characteristics may be degraded, and reliability and electrical properties, such as withstanding voltage, may be decreased significantly. More preferably, the above value is controlled to 0.95-1.05.

According to another preferred embodiment of the present invention, the barium element is present in the barium titanate based powder in an amount of 0.995-1.005 moles per mole of titanium element. When the barium element is present in an amount less than 0.995 moles, a portion of titanium salt is not converted into barium titanate but remains as it is. In addition, such a small amount of barium may cause abnormal particle growth and inhibit the overall tetragonal characteristics. On the other hand, when the barium element is present in an amount more than 1.005 moles, an excessive amount of barium salt may be present on the surface of barium titanate based particles to cause severe particle agglomeration, and may inhibit smooth ion diffusion, leading to a drop in content of tetragonal phases.

The barium titanate based powder represented by Chemical Formula 1 in accordance with an embodiment of the present invention is controlled in terms of particle growth by the dopants added thereto, and thus is provided as fine particles with ease. Particularly, niobium and phosphorus inhibit the elements that stimulate the production of cubic phases from being alloyed into the particles. As a result, even if the barium titanate based powder is provided as fine particles, it has a content of tetragonal phases of 60-100 wt % and maintains ferroelectricity, and thus may have a high relative dielectric constant. Therefore, the barium titanate based powder according to one embodiment of the present invention is characterized in that it has a tetragonal phase ratio of 60-100 wt % based on the total weight, and preferably has a particles size of 10-500 nm and a specific surface area of 2-35 $m^2/g$.

Since the barium titanate based powder has a high tetragonal phase content and ferroelectricity, it preferably has a relative dielectric constant of 1500-3000 at 25° C. In addition, the relative dielectric constant, $\in_T$, of the barium titanate based powder satisfies Equation 1 at −55 to 125° C. In other words, the barium titanate based powder satisfies the characteristics of CLASS II (high dielectric constant) X7R standard codes on the basis of ceramic capacitor standards defined by EIA.

$0.85 \times \in_0 \leq \in_T \leq 1.15 \times \in_0$ (wherein $\in_0$ is a relative dielectric constant at 25° C.)     [Equation 1]

The barium titanate based powder may be used in all ceramic electronic parts based on barium titanate, for example, ceramic capacitors, amplifiers, memory devices, modulators, electroacoustic transducers, actuators, piezoelectrics, positive thermistors, semiconductors, etc. Preferably, the barium titanate based powder is used as a dielectric material, more preferably as a material for ceramic capacitors, and most preferably as a material for multi-layer ceramic capacitors (MLCCs).

The barium titanate based powder may be prepared via a solid phase process including mixing an oxide or carbonate, followed by firing, a hydrothermal process including mixing an aqueous solution of starting materials with an aqueous alkaline solution, followed by hydrothermal treatment and firing, a hydroxide process or organic acid process including synthesizing a hydroxide salt or organic acid salt in a waterborne system, followed by firing, an alkoxide process including hydrolyzing an alkoxide mixture, followed by firing, or the like. However, barium titanate based powder may be prepared preferably via the process as described hereinafter. A preferred embodiment of the method for preparing the barium titanate based powder according to the present invention will be explained in more detail.

According to a preferred embodiment of the present invention, the method for preparing the barium titanate based powder represented by Chemical Formula 1 includes:

mixing barium carbonate, a titanium salt and water to provide a suspension;

subjecting the mixed suspension to wet pulverization and drying to provide mixed powder containing barium carbonate and titanium salt, and heat treating the mixed powder at 300-900° C.;

mixing the heat treated mixed powder with an oxide, chloride, carbonate, phosphate, nitrate, sulfate, acetate or a mixture thereof containing at least one element selected from the group consisting of yttrium (Y), lanthanoids, magnesium (Mg), calcium (Ca), strontium (Sr), phosphorus (P), niobium (Nb), aluminum (Al), vanadium (V), chrome (Cr), manganese (Mn), cobalt (Co), zirconium (Zr) and tantalum (Ta), as well as water to provide a suspension;

subjecting the mixed suspension to wet pulverization and drying to provide mixed powder, and further heat treating the mixed powder at 700-1100° C. to provide barium titanate based powder.

The titanium salt used as a starting material is represented by Chemical Formula 2:

$$TiO_2 \cdot n(H_2O)$$ [Chemical Formula 2]

wherein n is a real number ranging from 0 to 2.

In principle, when n is 0, the titanium salt is titanium dioxide; when n is 1, it is metatitanic acid; and when n is 2, it is orthotitanic acid. However, in practice, such definitions are not clearly distinguished from each other, as titanium compounds used recently as starting materials for barium titanate are provided in the form of finer particles. Particularly, the titanium salt prepared from titanium tetrachloride, titanium dichloride and titanyl sulfate starts from a very fine amorphous phase having no initial particle-like shape and has a gradually decreasing n value as the crystallization proceeds.

In the method, barium carbonate and titanium salt are preferably provided as fine particles. For example, in the case of the titanium salt, strong crystallization occurs when n approaches 0, and crude particles may be obtained as the crystals grow. Therefore, n is preferably equal to or greater than 0.5 and the specific surface area is preferably 100 m²/g or higher.

Advantageous Effects

The fine barium titanate based powder satisfies a high dielectric constant and a low temperature coefficient of capacitance, required in high-capacity MLCCs. More particularly, the barium titanate based powder meets the characteristics of CLASS II (high dielectric constant) X7R standard codes on the basis of ceramic capacitor standards defined by EIA. The barium titanate based powder also has an excellent sintering density, dielectric loss and insulation resistance.

BRIEF DESCRIPTION OF THE DRAWINGS

FIG. 1 is a photograph of barium titanate based powder obtained from Example 1, taken by scanning electron microscopy (SEM).

MODE FOR INVENTION

The advantages, features and aspects of the invention will become apparent from the following description of the embodiments with reference to the accompanying drawings, which is set forth hereinafter.

Example 1 a) Preparation of Suspension Containing Barium Carbonate and Titanium Salt

First, 422 L of pure water is introduced into a reaction tank. Then, 104.0 kg of a titanium salt (TiO₂.0.84(H₂O) available from Millennium Inorganic Chemicals) and 216.3 kg of barium carbonate (BaCO₃) are introduced thereto, followed by agitation, to provide a suspension.

b) Preparation and Heat Treatment of Mixed Powder Containing Barium Carbonate and Titanium Salt The suspension obtained from a) is pulverized and mixed sufficiently by using a bead mill to which zirconium dioxide-based spherical beads having a diameter of 0.3 mm are incorporated. Next, a small amount of suspension is taken and dried. According to X-ray fluorescence spectrometry (XRF), the molar ratio of Ba/Ti is 1.001. After the completion of pulverization and mixing, the suspension is spray dried to obtain mixed powder containing barium carbonate and titanium salt. Then, the mixed powder is heat treated under ambient atmosphere for 4 hours at 500° C.

c) Preparation of Suspension Containing Dopants

Diyttrium trioxide ($Y_2O_3$), magnesium carbonate ($MgCO_3$), diniobium pentaoxide ($Nb_2O_5$), diphosphorus pentoxide ($P_2O_5$), dialuminum trioxide ($Al_2O_3$), divanadium pentoxide ($V_2O_5$), dichromium trioxide ($Cr_2O_3$) and manganese dioxide ($MnO_2$) are weighed according to the composition as shown in Table 1 and added to the powder heat treated in b). Then, pure water is added thereto to provide a suspension.

d) Preparation of Mixed Powder Containing Dopants and Final Heat Treatment

The suspension obtained from c) is pulverized, mixed and spray dried sufficiently by using a wet bead mill in the same manner as described in b), and then introduced into an electric furnace to perform calcination at 950° C. for 2 hours under ambient atmosphere, thereby providing barium titanate based powder. XRF is carried out to determine the molar ratio, and it is shown that the resultant powder has the same composition as described in Table 1. The physical properties of the resultant barium titanate based powder are analyzed and the results are shown in Table 2. The specific surface area is determined via a Brunauer, Emmett and Teller (BET) method. The average particle size is determined by using a scanning electron microscopy (SEM) image at a magnification of 50,000×. Herein, the particle size is calculated as the diameter of circles having the same area. In addition, the tetragonal phase ratio is analyzed by multi-phase analysis using the Rietveld method.

Examples 2-9

Example 1 is repeated, except that the dopants in c) are added in the amounts varied as described in Table 1. The other operations are carried out in the same manner as described in Example 1. Each barium titanate based powder having different amounts of dopants is analyzed in terms of physical properties, and the results are shown in Table 2.

TABLE 1

Composition of barium titanate based Composite Oxides Obtained from Examples 1-9

Chemical Formula
$(Ba_{1.001}Y_{q1}Mg_{q2})(Ti_{1.000}Nb_{q3}P_{q4}Al_{q5}V_{q6}Cr_{q7}Mn_{q8})O_3$

| Example | q1 | q2 | q3 | q4 | q5 | q6 | q7 | q8 |
|---|---|---|---|---|---|---|---|---|
| 1 | 0.03 | 0.015 | 0.005 | 0.0075 | 0.0025 | 0.001 | 0.002 | 0.002 |
| 2 | 0.03 | 0.04 | 0.015 | 0.0075 | 0.0025 | 0.001 | 0.002 | 0.002 |
| 3 | 0.01 | 0.015 | 0.015 | 0.0075 | 0.0025 | 0.001 | 0.002 | 0.002 |
| 4 | 0.03 | 0.015 | 0.015 | 0.0025 | 0.0025 | 0.001 | 0.002 | 0.002 |
| 5 | 0.03 | 0.005 | 0.005 | 0.0025 | 0.0025 | 0.001 | 0.002 | 0.002 |
| 6 | 0.01 | 0.005 | 0.005 | 0.0025 | 0.0025 | 0.001 | 0.002 | 0.002 |
| 7 | 0.01 | 0.015 | 0.015 | 0.0025 | 0.0025 | 0.001 | 0.002 | 0.002 |
| 8 | 0.01 | 0.005 | 0.005 | 0.0025 | 0.0025 | 0.001 | 0.002 | 0.002 |
| 9 | 0.015 | 0.027 | 0.01 | 0.005 | 0.0025 | 0.001 | 0.002 | 0.002 |

TABLE 2

Physical Properties of barium titanate based Composite Oxides Obtained from Examples 1-9

| Example | Specific Surface Area ($m^2/g$) | Average Particle Diameter (nm) | Tetragonal Phase Ratio (wt %) |
|---|---|---|---|
| 1 | 6.4 | 157 | 81 |
| 2 | 7.2 | 134 | 79 |
| 3 | 5.9 | 166 | 84 |
| 4 | 5.8 | 172 | 83 |
| 5 | 6.0 | 169 | 83 |
| 6 | 5.7 | 177 | 84 |
| 7 | 6.0 | 166 | 82 |
| 8 | 5.4 | 185 | 85 |
| 9 | 6.6 | 150 | 80 |

Test Example 1

Barium carbonate and silicon dioxide powder are added to the barium titanate based powder obtained from Examples 1-9, each in an amount of 1 mole and 1.5 moles based on 100 moles of barium titanate based powder. The resultant mixed powder is subjected to wet mixing in a ball mill using zirconium dioxide beads having a diameter of 3 mm for 15 hours, in the presence of a mixed solution containing ethanol and toluene at a volume ratio of 1:1, as a solvent, thereby providing a suspension in which the solid content is dispersed sufficiently. Next, polyvinyl butyral as a polyvinyl-based binder is added to the suspension in an amount of 10 wt % based on the weight of the barium titanate based powder. Then, the resultant mixture is further subjected to wet mixing in a ball mill for 10 hours and is formed into a sheet with a thickness of 20 μm via a tape casting process. The resultant sheet is laminated and compressed to provide a molded body having a width of 10 mm, a length of 10 mm and a height of 1 mm. The molded body is subjected to debinding under nitrogen atmosphere at 450° C. for 12 hours, is maintained under hydrogen atmosphere with a partial pressure of $10^{-11}$ at 1200° C. for 2 hours, and then is reoxidized under 50 ppm oxygen atmosphere for 3 hours at 1000° C., thereby providing a fired specimen. A gallium-indium solid solution paste (Gallium-Indium EUTECTUC, 99.9+%, available from Sigma-Aldrich Corporation) is applied to the top surface and the bottom surface of the fired specimen, followed by drying. Then, the relative dielectric constant at 25° C., dielectric loss and insulation resistance are measured. In addition, a temperature coefficient of capacitance is measured while varying the temperature. The test condition and equipment for the electrical properties are shown in Table 3, and the test results are shown in Table 4. It can be seen that the barium titanate based powder meets the characteristics of CLASS II (high dielectric constant) X7R standard codes on the basis of ceramic capacitor standards defined by EIA.

TABLE 3

Test Condition and Equipment for Electrical Properties in Test Example 1

| Electrical Properties | Unit | Test Condition |
|---|---|---|
| Sintering Density | g/cm³ | Archimedes |
| Relative Dielectric Constant | | 25° C., 1 kHz, 1 $V_{rms}$, (HP 4288A) |
| Dielectric Loss | % | 25° C., 1 MHz, 1 $V_{rms}$, (HP 4288A) |
| Insulation Resistance | GΩ | 25° C., 1 kV, 1 min, (HP 4339B) |
| Capacitance Change at −55° C. | % (change from 25° C.) | −55 to 125° C., 1 kHz, 1 $V_{rms}$, (HP 4288A) |
| Capacitance Change at 125° C. | % (change from 25° C.) | |

TABLE 4

Electrical Properties of barium titanate based Composite Oxides Obtained from Examples 1-9

| Example | Sintering Density | Relative Dielectric Constant | Dielectric Loss | Insulation Resistance | Capacitance Change at −55° C. | Capacitance Change at 125° C. |
|---|---|---|---|---|---|---|
| 1 | 5.7 | 2160 | 0.44 | 170 | −5.8 | 8.13 |
| 2 | 5.6 | 2210 | 0.45 | 170 | −5.3 | 7.61 |
| 3 | 5.5 | 2030 | 1.00 | 150 | −6.2 | 7.83 |
| 4 | 5.5 | 2010 | 0.68 | 55 | −5.6 | 7.70 |
| 5 | 5.7 | 2450 | 0.99 | 76 | −6.7 | 8.90 |
| 6 | 5.8 | 2280 | 0.77 | 84 | −5.6 | 8.18 |
| 7 | 5.5 | 1950 | 0.99 | 140 | −6.3 | 8.32 |
| 8 | 5.6 | 2060 | 0.60 | 82 | −5.4 | 9.93 |
| 9 | 5.6 | 2470 | 0.57 | 140 | −6.8 | 9.15 |

While the present invention has been described with respect to the specific embodiments, it will be apparent to those skilled in the art that various changes and modifications may be made without departing from the spirit and scope of the invention as defined in the following claims.

What is claimed is:

1. A barium titanate based powder represented by Chemical Formula 1:

$(Ba_xR^1_{r1}R^2_{r2})(Ti_yR^3_{r3}R^4_{r4})O_3$   [Chemical Formula 1]

wherein $R^1$ is at least one element selected from the group consisting of yttrium (Y) and lanthanoids; $R^2$ is at least one element selected from the group consisting of magnesium (Mg), calcium (Ca) and strontium (Sr); $R^3$ includes phosphorus (P) and niobium (Nb); $R^4$ is at least one element selected from the group consisting of aluminum (Al), vanadium (V), chrome (Cr), manganese (Mn), cobalt (Co), zirconium (Zr) and tantalum (Ta); $r_1$ and $r_3$ independently represent a real number greater than 0 and equal to or less than 0.05; $r_2$ and $r_4$ independently represent a real number greater than 0 and equal to or less than 0.1; and $(x+r_1+r_2)/(y+r_3+r_4)$ is a real number ranging from 0.85 to 1.15.

2. The barium titanate based powder according to claim 1, wherein $r_1$, $r_2$, $r_3$ and $r_4$ independently represent a number greater than 0 and equal to or less than 0.03.

3. The barium titanate based powder according to claim 1, wherein $R^3$ includes niobium and phosphorus at a molar ratio of phosphorus to niobium ranging from 1:0.1-2.0.

4. The barium titanate based powder according to claim 1, wherein $R^1$ is yttrium (Y), $R^2$ is magnesium (Mg), $R^3$ includes phosphorus (P) and niobium (Nb), and $R^4$ includes aluminum (Al), vanadium (V), chrome (Cr) and manganese (Mn).

5. The barium titanate based powder according to claim 1, wherein barium elements contained in the barium titanate based powder are present in an amount of 0.995-1.005 moles per mole of titanium elements.

6. The barium titanate based powder according to claim 1, which comprises a tetragonal phase at a ratio of 60-100 wt % based on the total weight of the barium titanate based powder.

7. The barium titanate based powder according to claim 1, which has a particle size of 10-500 nm and a specific surface area of 2-35 m$^2$/g.

8. The barium titanate based powder according to claim 1, which has a relative dielectric constant of 1500-3000 at 25° C.

9. The barium titanate based powder according to claim 1, which has a relative dielectric constant, $\in_T$, satisfying Equation 1 at −55 to 125° C.:

$$0.85 \times \in_0 \leq \in_T \leq 1.15 \times \in_0 \text{ (wherein } \in_0 \text{ is a relative dielectric constant at 25° C.)} \qquad \text{[Equation 1]}.$$

10. Dielectric materials comprising barium titanate based powder according to claim 1.

11. Ceramic electronic parts comprising barium titanate based powder according to claim 1.

* * * * *